United States Patent [19]

Chen

[11] 3,732,359

[45] May 8, 1973

[54] BEAM INDEX COLOR TELEVISION DISPLAY DEVICE

[75] Inventor: Yen-Sun Chen, Fanwood, N.J.

[73] Assignee: Bell Telephone Laboratories, Incorporated, Murray Hill, N.J.

[22] Filed: Apr. 19, 1972

[21] Appl. No.: 245,452

[52] U.S. Cl. .......... 178/5.4 H

[51] Int. Cl. .......... H04n 9/24

[58] Field of Search .......... 178/5.4 H, 5.4 F; 315/12 I, 21 C

[56] References Cited

UNITED STATES PATENTS

| | | | |
|---|---|---|---|
| 2,792,522 | 5/1947 | Welch | 178/5.4 F |
| 2,877,295 | 3/1959 | Loughlin | 178/5.4 F |
| 2,912,615 | 11/1959 | Lubszynski | 178/5.4 F |
| 3,013,113 | 12/1961 | Sunstein | 178/5.4 F |
| 3,054,853 | 9/1962 | Sunstein | 178/5.4 F |

*Primary Examiner*—Robert L. Richardson
*Assistant Examiner*—Richard D. Maxwell
*Attorney*—R. J. Guenther et al.

[57] ABSTRACT

The beam index concept for color television display tubes has been known for some time, and although this color display approach is fundamentally more attractive than the commercially favored three-gun shadow mask tube, techniques for producing the indexing signal have been inadequate. According to the invention, index signals in a single-gun tube with horizontal phosphor stripes, operating in a line (color)-sequential mode, are generated by UV phosphor bars spaced uniformly along each color stripe but with different spacings for each color. As the beam scans a stripe, an optical signal is generated with a frequency corresponding to the periodicity of the phosphor index bars. The optical signal is detected with a UV detector. The amplitude of each frequency will indicate the beam size and vertical position. The index signals are fed to a signal processor which, by simple filtering, will generate error correction signals which are in turn fed to the deflection circuit to correct the beam position. The use of the optical index signal ensures isolation of the beam index signal from the video.

2 Claims, 3 Drawing Figures

BEAM INDEX COLOR TELEVISION DISPLAY DEVICE

For many years, there have been efforts in the television industry to develop a simplified electron beam color display device. The most highly developed color receiver operates with multiple electron beams and a shadow mask for directing each beam on the appropriate color phosphor. In spite of recent advances in this type of device it is still inherently complex and costly, and is susceptable to problems in color purity, often due to misalignment of one or more of the beams. The mechanical registration mechanism used in these devices for color selection cannot identify registration errors.

A video receiver which uses beam position feedback and is inherently self-correcting with respect to alignment has been known for some time. This device uses a single beam and is known generically as the beam index tube. Instead of mechanically restricting the beam-landing to a particular color phosphor the beam is passed over all color phosphors and is modulated in accordance with its instantaneous position to give the desired color. It is necessary to provide electrically useful information indicating the instantaneous location of the beam with respect to the color phosphors.

Direct control of the beam position makes the beam index tube especially attractive. However, the absence of an effective way of performing the indexing function has limited the commercial acceptance of the device.

According to the invention the beam position is monitored and controlled using optical sensing. To do this according to the invention requires the tube to have horizontal color phosphor stripes and to operate in the line (color)-sequential mode. Each color line is provided with UV phosphor indexing bars and the space between the bars on a given color line is characteristic of that color. A UV detector, responsive to the output of the phosphor indexing bars, will generate an indexing signal with a frequency characteristic of the line, or combination of lines, along which the beam is scanning. The amplitude of the respective frequencies can provide information giving the beam spot size and the degree of overlap between adjacent stripes. This signal can be processed, for example by filtering, to generate error corrections. The error corrections are fed to the scan circuits to adjust the beam position or size.

These and other aspects of the invention will become more evident from the following detailed description. In the drawing.

Figure 1:
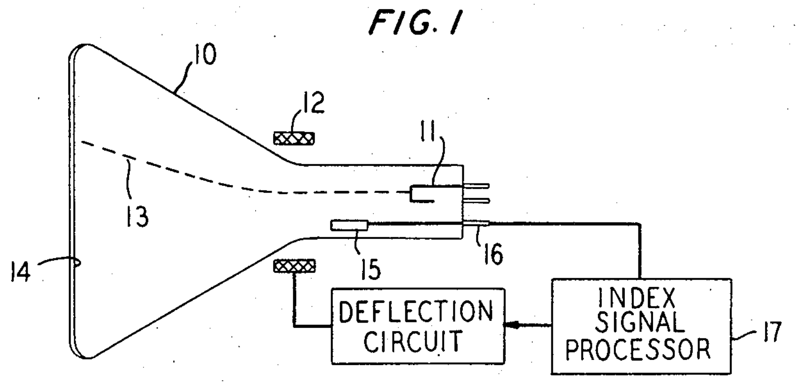
FIG. 1 is a schematic view of a beam index color display tube constructed according to the principles of the invention.

Referring to FIG. 1, the usual evacuated tube envelope is shown at 10 with a conventional electron gun 11 and deflection means 12 generating beam 13 for scanning the faceplate 14. The tube detail evident from this figure is standard except for the UV light detector 15, disposed so as to measure the amount and frequency of UV light generated by cathodoluminescence from the faceplate 14. The details of the UV detector are a matter of choice and form no part of the invention. The detector is arranged so that the electrical output is available from one of the terminal pins 16 from which it is fed to the index signal processor 17.

Figure 2:
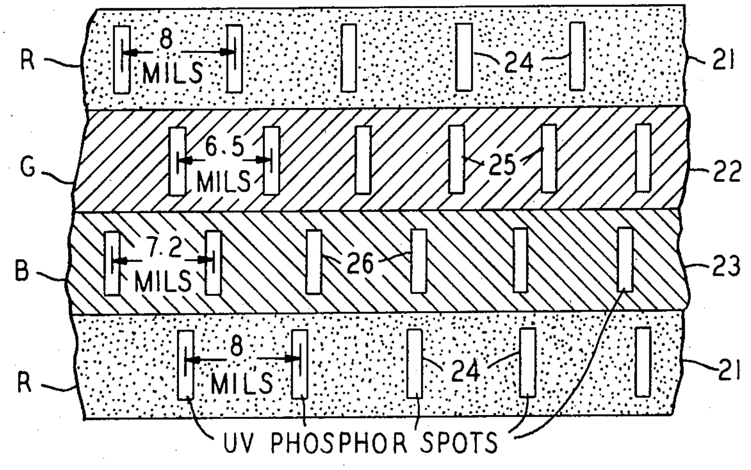
FIG. 2 is a detailed view of the target faceplate of the tube of FIG. 1 showing the arrangement of indexing phosphors.

The details of a portion of the tube faceplate 14 are shown in the enlarged schematic of FIG. 2. This view is as seen by the electron beam. The tube cross section is standard except for the addition of the phosphor indexing bars. In FIG. 2 the phosphor stripes extend horizontally along the width of the beam scan.

The stripes 21–23 represent three different color phosphors, red, green and blue, as suggested by the difference in hatching. The indexing bars 24–26 are spaced along the stripes with a constant periodicity but with a different periodicity for each color. An exemplary dimensional arrangement for 7 mil stripe widths is 8 mils center-to-center for the red index bars 24, 6.5 mils for the green index bars 25, and 7.2 mils for the blue index bars 26. These spacings will generate convenient signal frequencies in the system to be described in detail below. The UV phosphor index bars are all identical and may assume a variety of sizes and shapes as long as their periodicity can be optically discerned and they do not interfere with the activation of the color phosphors. If the index bars have conventional thickness the attenuation of the electron beam on the phosphor layer will not be too severe. Otherwise the spacing of the bars is too small to be resolved by the eye and the only subjective effect on the video picture will be a minor decrease in brightness.

Specific phosphors that are available and suitable for use in the device of this invention are described in A. H. Gommes de Mesquita and A. Bril, *J. Electrochem. Soc.*, 116,871, 1969. These phosphors emit at 330 nm with a decay time of 25 nsec and a radiant efficiency as high as 20 percent.

The signal from the UV detector 14 is normally a composite of all three optical frequencies with magnitudes weighted by the amount of coverage on each type of color phosphor stripe by the same beam. These magnitudes will be identified as error signals $\epsilon_r$, $\epsilon_b$ and $\epsilon_g$ for the red, blue and the green phosphor stripes respectively.

Let us assume that the beam is already on a green stripe, and furthermore, that we intend to keep the beam on that stripe. The following could happen:

1. Appearance of both $\epsilon_r$ and $\epsilon_b$ in addition to $\epsilon_g$ suggests that the beam is out of focus. This information is extremely useful and is realized through the unique combination of the line (color)-sequential operation and the use of horizontal color phosphor stripes. It may be advantageous to maintain a small amount of $\epsilon_b$ and $S_r$ (say 10 percent) so that we can have optimum beam size by shrinking the chromaticity triangle.
2. Appearance of excessive $\epsilon_r$ or $\epsilon_b$ in addition to $\epsilon_g$ suggests that the beam is too high or too low.
3. Disappearance of $\epsilon_g$ but not $\epsilon_b$ and/or $\epsilon_r$ suggests that the beam is out of place.

The position of the beam at the beginning of each line can easily be established by checking the magnitude of each $\epsilon_i$. If necessary, one can turn the beam on to a constant intensity level over a short fraction of the line scan time to position the beam onto the desired color stripe. To do this the basic information required is the position and the focusing feedback signals.

For the purpose of describing exemplary operating parameters for a video system operating according to the invention, we will assume a video system with the following specifications:

scan: line(color) - sequential luminous bandwidth: 3 MHz frame period: 1/30 sec. 2:1 field interlace number of lines/field:750.

With a linear system, the indexing signal $(t)$ obtained at the output of a UV detector can be expressed as:

$$(t) = CI(t) \sum_i s_i(t) F_i(t) \quad (1)$$

$$i = r(\text{red}), b(\text{blue}), g(\text{green})$$

where $C$ is a proportionality constant, while the time-dependent terms are explained below.

$I(t)$ is the intensity of the writing beam and varies according to the magnitude of the input video signal.

$s_i(t)$ represents the fractional coverage on a given type of color phosphor stripe by the writing beam. For instance, we may have at some instant $s_r = 0.2$, $s_b = 0.1$ and $s_g = 1$. It is obvious that the $s_i$'s contain the information as to the location and the size of the writing beam. We assume that the $s_i(t)$ is a slow-varying function of time and has a bandwidth of a few hundred kHz.

$F_i(t)$ is the index function to be best defined as:

$$F_i(t) = (t)/C \text{ if } I(t), s_i(t) = 1$$

and $$s_{j,j \neq i} = 0.$$

In other words, $F_i(t)$ is proportional to the indexing signal generated by a scanning beam of constant intensity writing on a single horizontal color phosphor stripe. Neglecting higher frequency terms in the Fourier expansion, we have $$F_i(t) = g_i + h_i \sin(\omega_i t + \phi_i)$$

$$\omega_i = 2\pi f_i = 2\pi v/x_i \quad (3)$$

where $v$ is the speed of scan, $x_i$ is the characteristic spacing of the indexing spots and $g_i$, $h_i$ and $\phi_i$ are three structural constants.

For the purpose of discussion, we shall adopt the following simple forms for $I(t)$ and $s_i(t)$:

$$I(t) = 1 + m \sin \omega_v t,\ m \leq 1 \quad (4)$$

$$s_i(t) = p_i + q_i \sin(\omega_e t + \theta_i) \quad (5)$$

where $\omega_v$ and $\omega_e$ are two representative frequencies and $m$, $p_i$, $q_i$ and $\theta_i$ are constants. Furthermore, we have $\omega_i >> \omega_v$ and $\omega_e$.

Substituting Equations (3), (4) and (5) into Equation (1) and collecting only the higher frequency terms ($\omega >> \omega_v$), we obtain $$(t) = C'(1 + m \sin \omega_v t) \sum_i p_i + q_i \sin(\omega_e t + \theta_i) \; x \sin(\omega_i t + \phi_i) \quad (6)$$

Figure 3:
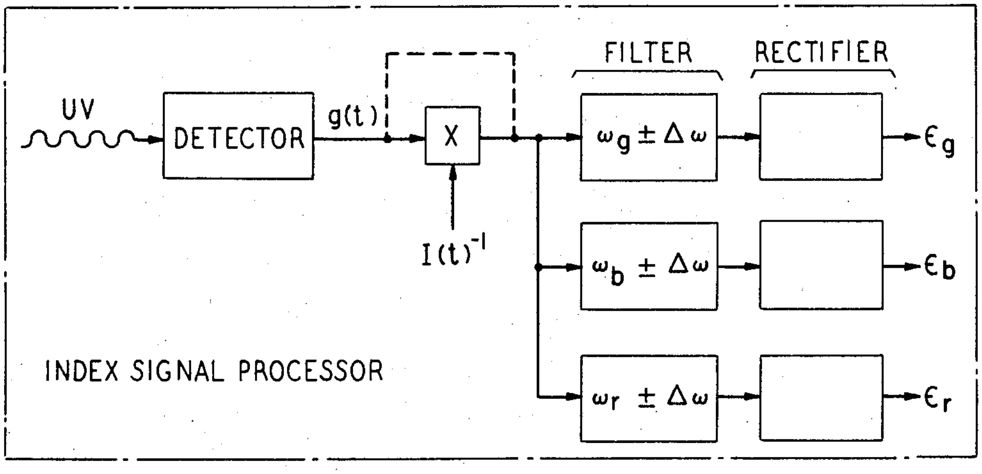
FIG. 3 is a block diagram of an exemplary index signal processing circuit for generating error correction signals.

FIG. 3 depicts the block diagram for the processing of the indexing signal. Two different methods are possible. In both cases three separate error signals containing the important information about the beam coverage functions $s_i$'s are derived.

With a dividing stage, notice in Equation (6), $I(t)$ is a common multiplier to the three amplitude-modulated terms within the summation sign. It is therefore possible to add a dividing stage to the circuit, such as an automatic gain control circuit for the UV detector to eliminate the influence of $I(t)$. The indexing signal so derived is then filtered and rectified to yield three separate error signals.

$$\epsilon_i(t) = C_i s_i(t) \quad (7)$$

The three filters used in the circuit have their center frequencies at $f_i$ and a bandwidth of $\omega_e/\pi$ (~1 MHz). For example, we may choose $x_r = 8$, $x_b = 7.2$ and $x_g = 6.5$ mils which correspond to $f_r = 18$, $f_b = 20$ and $f_g = 22$ MHz in the system described and assuming a screen width of 5 inches. A bandwidth of 2 MHz is adopted to accommodate in part the variations in the speed of the horizontal scan up to 5 percent. With the phosphors mentioned previously it is reasonable to use an indexing frequency as high as 30 MHz or a spatial frequency of 210 cycles/inch.

Without a dividing stage, Equation (6) can be rearranged to give $$(t) = \sum_i C'(1 + m \sin \omega_v t) \; x[p_i + q_i \sin(\omega_e t + \theta_i)] \sin(\omega_i t L \phi_i) \quad (8)$$

Equation (8) shows that the indexing signal is the summation of three amplitude-modulated signals, each has a carrier frequency of $f_i$ and a bandwidth of $(\omega_v + \omega_e)/\pi$ (~7.0 MHz). Three separate error signals can again be obtained after filtering and rectifying, they are:

$$\epsilon_i(t) = C_i I(t) s_i(t). \quad (9)$$

For example, we may choose $x_r = 11$, $x_b = 7.8$ and $x_g = 4.8$ mils which correspond to $f_r$ 13, $f_b = 21.5$ and $f_g = 30$ MHz in the system described. A bandwidth of 8.5 MHz is adopted for reasons stated previously. It is clear that filters of much broader bandwidth have to be used in the absence of a dividing stage. Accordingly, the first method is preferred.

Among the advantages of the color CRT system described above are:

1. Color purity is well defined over the entire phosphor screen by virtue of the feedback information on focusing. As was discussed previously, the chromaticity triangle may be deliberately shrunk in order to have more effective utilization of the screen phosphor.
2. The maximum (saturated) brightness using P22 phosphor is estimated at 200 fL for the system described by virtue of the complete utilization of the phosphor screen. We then arrive at a usable highlight brightness in the vicinity of 50 fL (assuming an operating brightness of 100 fL and a faceplate with a transmission of 50 percent) to the viewer. However, such a brightness is to be achieved by a beam current of about 60 $\mu$A with a spot size of 7 mils (with boundaries at 10–20 percent of maximum beam intensity).

3. Both Equations (7) and (9) indicate the error signals generated at any instant are proportional to the coverage functions $s_i$'s. This means that their relative magnitudes are not subject to the fluctuation in the writing beam. Since the indexing frequencies are far from the writing frequency $\omega_v$ and the coverage frequency $\omega_e$, one can therefore apply the demodulation techniques of conventional AM signals to the error signals.
4. The UV indexing spots can be accurately applied to the faceplate by modern photolithography techniques. Some beam energy is inevitably lost in generating the indexing signals, but this can be kept at a minimum by using rather narrow indexing spots (~1 mil). The brightness pattern so formed on the screen caused by this loss of beam energy over the indexing spots need not cause unpleasant effects to the viewer for the following reasons: (i) the spacing between spots is beyond the acuity of human eye from a distance of some 30 inches, (ii) the phase relationship between two adjacent stripes of the same color phosphor can be completely random.

Various additional modifications and extensions of this invention will become apparent to those skilled in the art. All such variations and deviations which basically rely on the teachings through which this invention has advanced the art are properly considered to be within the spirit and scope of this invention.

What is claimed is:

1. A beam index cathode ray display device comprising:

a vacuum envelope, a cathodoluminescent screen within said envelope and made up of at least two series of alternating parallel phosphor stripes each series comprising a different color phosphor, a single electron beam forming and scanning means within said envelope adapted to scan sequentially the alternate stripes in the direction of their length, the invention characterized in that the alternate phosphor stripes additionally include a plurality of ultraviolet phosphor regions spaced equally apart on the stripes of each series but with different spacings for each series so that the beam, on scanning a given stripe, generates an optical pulse signal with a frequency characteristic of the color of the phosphor of that stripe, and characterized further by means for detecting the optical pulse signal.

2. The device of claim 1 further including means for processing the optical pulse signal to generate beam position error correction signals and means for imposing these error correction signals on the electron beam forming and scanning means to correct the beam position.

* * * * *